(12) United States Patent
Trakselis

(10) Patent No.: US 11,166,593 B2
(45) Date of Patent: Nov. 9, 2021

(54) FOOD AND BEVERAGE PROCESSING DEVICE COMPRISING A MAGNETIC COUPLING

(71) Applicant: Millo Appliances, UAB, Vilnius (LT)

(72) Inventor: Ruslanas Trakselis, Vilnius (LT)

(73) Assignee: Millo Appliances, UAB, Vilnius (LT)

( * ) Notice: Subject to any disclaimer, the term of this patent is extended or adjusted under 35 U.S.C. 154(b) by 349 days.

(21) Appl. No.: 16/346,925

(22) PCT Filed: Nov. 10, 2017

(86) PCT No.: PCT/IB2017/057029
§ 371 (c)(1),
(2) Date: May 2, 2019

(87) PCT Pub. No.: WO2018/104813
PCT Pub. Date: Jun. 14, 2018

(65) Prior Publication Data
US 2020/0054172 A1     Feb. 20, 2020

(30) Foreign Application Priority Data
Dec. 5, 2016   (LT) .................................... 2016 114

(51) Int. Cl.
*A47J 43/046*     (2006.01)
*A47J 43/08*      (2006.01)
(Continued)

(52) U.S. Cl.
CPC .......... *A47J 43/0465* (2013.01); *A47J 43/08* (2013.01); *B01F 13/08* (2013.01); *B01F 15/0048* (2013.01); *B01F 2015/00649* (2013.01)

(58) Field of Classification Search
CPC ....... A47J 43/0465; A47J 43/08; B01F 13/08; B01F 15/0048; B01F 2015/00649
(Continued)

(56) References Cited

U.S. PATENT DOCUMENTS 3,627,008 A * 12/1971 Samuelian ............ A47J 43/046
                                                    241/199.12
3,785,579 A *  1/1974 Voglesonger ........... B02C 23/04
                                                    241/282.1
(Continued)

OTHER PUBLICATIONS

"DriveTechnology.pdf", KTR systems GmhB, Rheine, Germany. 2021. pp. 230-245. https://www.ktr.com/fileadmin/ktr/media/Tools_Downloads/kataloge/DriveTechnology.pdf [Accessed Sep. 14, 2021].
(Continued)

*Primary Examiner* — Tony G Soohoo
(74) *Attorney, Agent, or Firm* — AAA Law, UAB

(57) ABSTRACT

This disclosure relates to a processing device (1) of food products and drinkables, which uses space-varying magnetic field for blade (6) rotation (i.e., it has a magnetic coupling between components in the blender base (2) and in the cover (7) of the blender jar (3), works in a principle of an inverted flask, consists of two separate parts, one of which is a removable flask with a built-in second component of the magnetic coupling (21) and the base with an electric motor (19) and a first component (20) the magnetic coupling. The second magnetic coupling component, which is integrated in the cover (7), has a disc (8) of electrically conducting metal (aluminum, copper or other material suitable for magnetic coupling may be used), in which Foucault currents can be induced. The disc (8) may be replaced by a holder (10) with two (or more) permanent magnets (11), which are added to suit to the magnetic coupling requirements.

7 Claims, 5 Drawing Sheets

(51) Int. Cl.
*B01F 13/08* (2006.01)
*B01F 15/00* (2006.01)

(58) Field of Classification Search
USPC .................................................. 366/273, 274
See application file for complete search history.

(56) References Cited

U.S. PATENT DOCUMENTS

| | | | | |
|---|---|---|---|---|
| 3,881,705 A * | 5/1975 | Greenspan | ............ | A47J 43/046 241/282.2 |
| 4,889,248 A * | 12/1989 | Bennett | ............ | A47J 43/046 215/390 |
| 5,911,504 A * | 6/1999 | Schindlegger, Jr. | .... | A47J 43/04 366/197 |
| 6,210,033 B1 * | 4/2001 | Karkos, Jr. | ............ | A23G 9/045 366/205 |
| 6,336,603 B1 * | 1/2002 | Karkos, Jr. | ............ | A23G 9/045 241/101.2 |
| 7,430,957 B2 * | 10/2008 | Sands | ............ | A47J 43/046 99/513 |
| 7,441,944 B2 * | 10/2008 | Sands | ............ | A47J 43/046 366/205 |
| 7,758,236 B2 * | 7/2010 | McGill | ............ | A47J 36/022 366/199 |
| 7,878,702 B2 * | 2/2011 | Peng | ............ | A47J 43/0716 366/145 |
| 7,993,053 B2 * | 8/2011 | McGill | ............ | A47J 43/046 366/199 |
| 8,122,821 B2 * | 2/2012 | Sands | ............ | A47J 19/027 99/513 |
| 8,282,268 B2 * | 10/2012 | Karkos, Jr. | ............ | A47J 43/085 366/273 |
| 8,851,739 B2 * | 10/2014 | Gonzalez | ............ | A47J 43/046 366/130 |
| 8,887,628 B2 * | 11/2014 | Cai | ............ | A47J 27/21041 99/484 |
| 9,357,882 B2 * | 6/2016 | Chen | ............ | B01F 3/04453 |
| 9,565,970 B2 * | 2/2017 | Alet Vidal | ............ | A47J 43/046 |
| 9,815,037 B2 * | 11/2017 | Brotzki | ............ | A47J 43/0766 |
| 10,213,756 B2 * | 2/2019 | Brotzki | ............ | A47J 43/0766 |
| 10,299,629 B2 * | 5/2019 | Bascom | ............ | A47J 43/046 |
| 10,363,530 B2 * | 7/2019 | Kolar | ............ | H04L 12/281 |
| 10,730,026 B2 * | 8/2020 | Hoare | ............ | A47J 43/0727 |
| 10,849,462 B2 * | 12/2020 | Ciepiel | ............ | A47J 43/046 |
| 2001/0002892 A1 * | 6/2001 | Karkos, Jr. | ............ | A23G 9/12 366/274 |
| 2002/0079393 A1 * | 6/2002 | Karkos, Jr. | ............ | A23G 9/224 241/92 |
| 2013/0028044 A1 * | 1/2013 | Karkos, Jr. | ............ | A47J 43/0465 366/274 |
| 2013/0168385 A1 * | 7/2013 | Alet Vidal | ............ | B01F 7/162 219/647 |
| 2017/0196405 A1 * | 7/2017 | Hoare | ............ | A47J 43/0716 |
| 2020/0054172 A1 * | 2/2020 | Trakselis | ............ | B01F 13/08 |
| 2021/0076876 A1 * | 3/2021 | Ciepiel | ............ | A47J 43/08 |

OTHER PUBLICATIONS

"Permanent magnetic couplings for mechanical power transmission. pdf", JBJ Techniques Limited, Surrey, United Kingdom. https://www.jbj.co.uk/magnetic-couplings.html. [Accessed Sep. 14, 2021].

* cited by examiner

FOOD AND BEVERAGE PROCESSING DEVICE COMPRISING A MAGNETIC COUPLING

FIELD OF INVENTION

This is a food and beverage processing device, which can be used as a blender, a mixer, a crusher, a whisk, a flask, etc. More precisely, this is a food processing device, which employs alternating magnetic flux and a magnetic coupling for the rotation of the blades.

BACKGROUND OF INVENTION

Mixing and blending devices, such as blenders and mixers, which are employed to process food and beverages, are common in normal household applications. Often these devices comprise a main container and a lid, which covers the open ending of the main container to maintain the contents to be processed hermetically sealed inside the container. Aforementioned container is also often used to contain the processed food or beverages during further consumption. Food is processed by use of a blade assembly, which are commonly affixed onto top of a rotation shaft. A motor, mechanically attached to the rotation axis, rotates the shaft, consequently rotating the blades.

Blades which are rotated by a mechanical coupling can be found in home kitchen appliances most frequently. Commonly, these blades are mounted into a detachable glass or plastic container of a mixer (or a blender) in such a manner, that it could be rotated at a sufficient frequency, by which it is capable to process food or beverages into a uniform consistency. It is also known, that in food processing devices a magnetic flux can be applied in order to exclude mechanical couplings from such constructions. It enables the user to station the container of a blender or a mixer into a working stance more easily. Also, containers, which do not comprise mechanical couplings, are commonly more easy to clean and it's dimensions are smaller. But the main drawback of such food processing devices is that the container, in which the food is being processed, is mechanically affixed to the housing by employing various holders and mechanical couplings.

One processing device, utilizing magnetic field for rotation of its parts, is described in the U.S. Pat. No. 6,210,033, published on 2002 Jun. 27. This device employs magnetic induction drive for a rotatable driven member in a sealed housing, in particular, a shaft-mounted blade in a blender cup, which uses a comparatively thin circular plate of a magnetizable material with circumferentially arrayed poles secured within the housing to the shaft. A brushless d.c. motor in a base separate from the housing has a rotor formed as an array of pie-shaped permanent magnet regions that interact with an electronically controlled, rotating electromagnetic field produced by a ring of stator coils. A second such permanent magnet is coupled to rotate coaxially and in unison with the rotor, with poles of opposite polarity aligned and adjacent one another. A steel disc is sandwiched between and bonded to the rotor and the second permanent magnet. The magnetic field (lines of flux) of the second magnet extends axially away from the rotor to induce magnetic poles of opposite polarity in the drive plate. This second magnet-to-plate magnetic coupling operates across a closely-spaced gap that includes the bottom wall of the blender cup base, the upper wall of the housing, and air gaps between these walls, and the plate and the second magnet.

Another food and beverage processing device, employing magnetic field for the rotation of its parts is described in the Australian patent no. AU2015201257, published on 2015 Nov. 12. It describes a low-profile motor for portable appliances, where a blending appliance includes a housing having a jar receiving portion defined between an upper housing and a base portion laterally extending from the housing. A blender jar is adapted to be laterally received within the jar receiving portion and includes a jar base and a receptacle portion. A stator is disposed in the base portion of the housing and is adapted to create an electromagnetic field to drive a rotatable magnetic coupler disposed in the jar base as part of a magnetic coupling system. The rotatable magnetic coupler is coupled to a drive shaft that is further coupled to a blade assembly disposed within the receptacle portion of the blender jar. The blade assembly is configured to process ingredients within the receptacle portion of the blender jar as coupled to the rotatable magnetic coupler.

Yet another food processing device, utilizing magnetic field for rotation of its parts, is described in a Chinese patent no. CN201987367, published on 2011 Sep. 28. The utility model discloses a blender, and aims at providing the blender which has a magnetic transmission mechanism capable of approaching a heating body and has low cost. The utility model adopts the technical scheme that: the blender comprises a main body which is made of a diamagnetic material and a cover body, wherein a base is arranged below the main body, the base is provided with a drive device, an output shaft of the drive device is provided with a rotating body, the rotating body is provided with a permanent magnet, the cover body is lovably provided with a pro-magnet body which is driven by the permanent magnet, the main body is provided with a heating element, the output shaft is provided with threads, and the rotating body is lovably connected onto the output shaft through the threads.

The inventions mentioned above are relevant due to their purpose—to provide a food or beverage processing device, employing magnetic field for rotation of its parts by immovably connecting the blades of the device to the rotor or by mounting magnets and using a magnetic coupling. But the aforementioned patent applications do not provide a solution to connect the food processing device's blades with a component of the magnetic coupling, where the aforementioned component is covertly installed into the cover lid of a blender or a mixer. Also, the aforementioned patent applications do not provide a solution to install a magnetic coupling inside the container of the device, which is also a blender bottle, adapted to be carried and to be drank from. Because none of the prior arts provided such solutions, it could be regarded as drawbacks of such inventions. For instance, while using aforementioned devices, after the food processing the detachment of the container is inconvenient and slow due to the mechanical fixation. For this reason it is more difficult to use such devices, and their cleaning is more challenging. Nonetheless, cleaning deep containers is also challenging due to the inability to reach the bottom part of the blades.

SUMMARY

In order to eliminate the drawback indicated above, this invention provides a food and beverage processing device (it can be a mixer, a blender, a bottle, etc.), which rotates its blades by employing an alternating magnetic flux. It works as an upside-down drinker and comprises two separate parts, where one is a removable bottle with an embedded rotor or in which blades, mounted into the lid of the container, are directly connected to a rotor. Such food processing construction allows to eliminate a mechanical coupling between the bottle and the base. Such solution simplifies the processes of container removal, usage and washing. Nonetheless, such device offers an additional functionality of portability. For the sake of clarity, here and further, such device will be referred as a blender, but same solution can be applied to an ice crusher, food shredder, bar blender, coffee mill, meat grinder, mixer or other device, which employs rotating blades or shoulders in processing of food or beverages. For this reason, patent protection must comprise all the aforementioned devices.

The blender, described by this invention, comprises two main separate parts: the base, which houses an electric motor and one coupling component, and a removable glass or plastic container, composed of a lid and a bottle. In this solution, the container is situated onto the base with the lid facing down, where the lid houses tightly packed second component of the magnetic coupling, which is stiffly connected with the blades or the shoulders.

In the most preferred embodiment, the second component of the magnetic coupling, which is mounted into the lid, comprises a metal disc, consisting of or partly containing metal, which can be magnetized in effect of a variable magnetic field. Such metal can be aluminum, copper or other material, suitable for the magnetic coupling. The aforementioned disc is coaxially connected with blade or shoulder system, which is used for blending, mixing or grinding foods and beverages. In such manner, blades, which are embedded into the lid, through the magnetic coupling are connected to the rotor of an electric motor, which is embedded into the base part of the device.

In one embodiment, the metal disc, installed into the lid, is replaced with a retainer, comprising at least two permanent magnets, arranged in a manner, which enables implementation of a magnetic coupling. The purpose of the aforementioned retainer is same as of the aluminum disc—to carry out the purpose of the second component of the magnetic coupling, transferring torque to the blade system.

In order to consume blended or mixed food or beverages, the lid, comprising the blades system and the second component of the magnetic coupling, has to be taken off from the container after the preparation process is finished, to enable the use of the aforementioned container as a drinking bottle or a food container.

DESCRIPTION OF DRAWINGS

The drawings are provided herein only for the sake of clarity and should be referred only as a possible implementation of the invention and should not limit the scope of the invention by any means. Exemplary drawings of the food and beverages processing device.

DETAILED DESCRIPTION OF PREFERRED EMBODIMENTS

Figure 1:
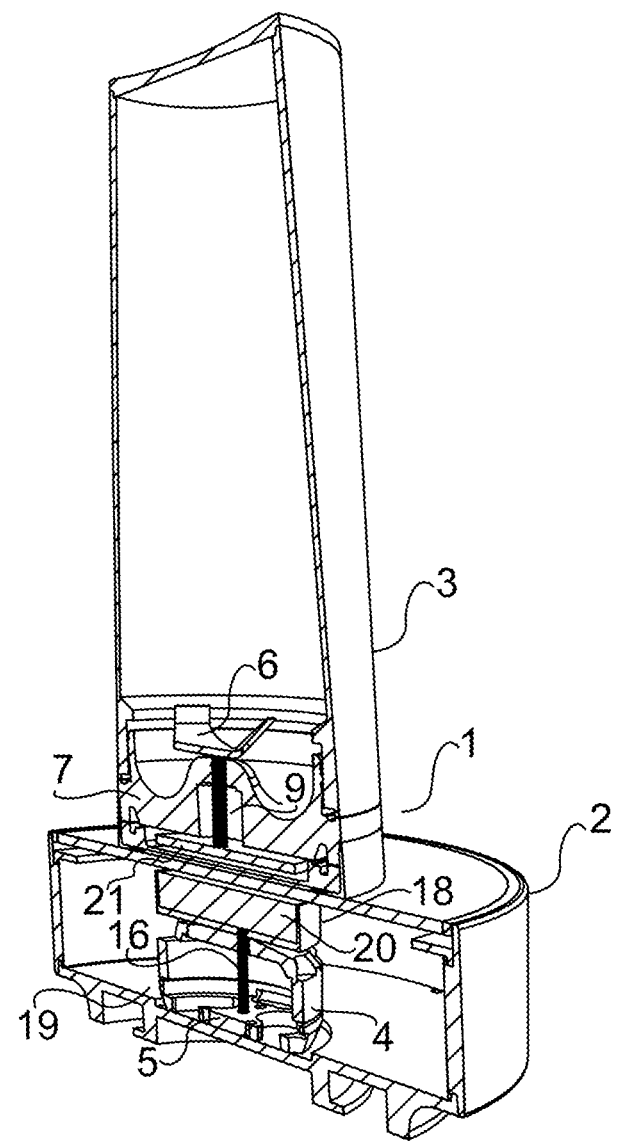
FIG. 1 is a schematic representation of food and beverage processing device, comprising a metal disc (8). Cross section in isometric projection view.
Figure 2:
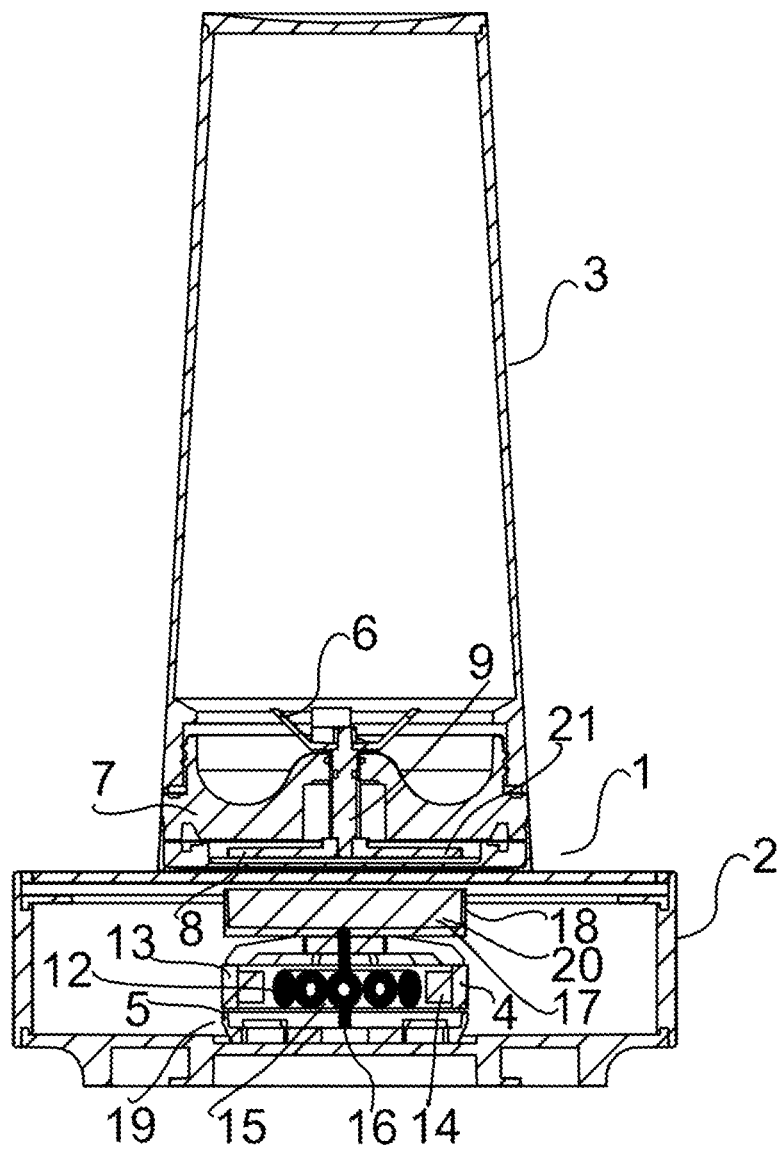
FIG. 2 is a schematic representation of food and beverage processing device, comprising a metal disc (8). Cross section view.
Figure 3:
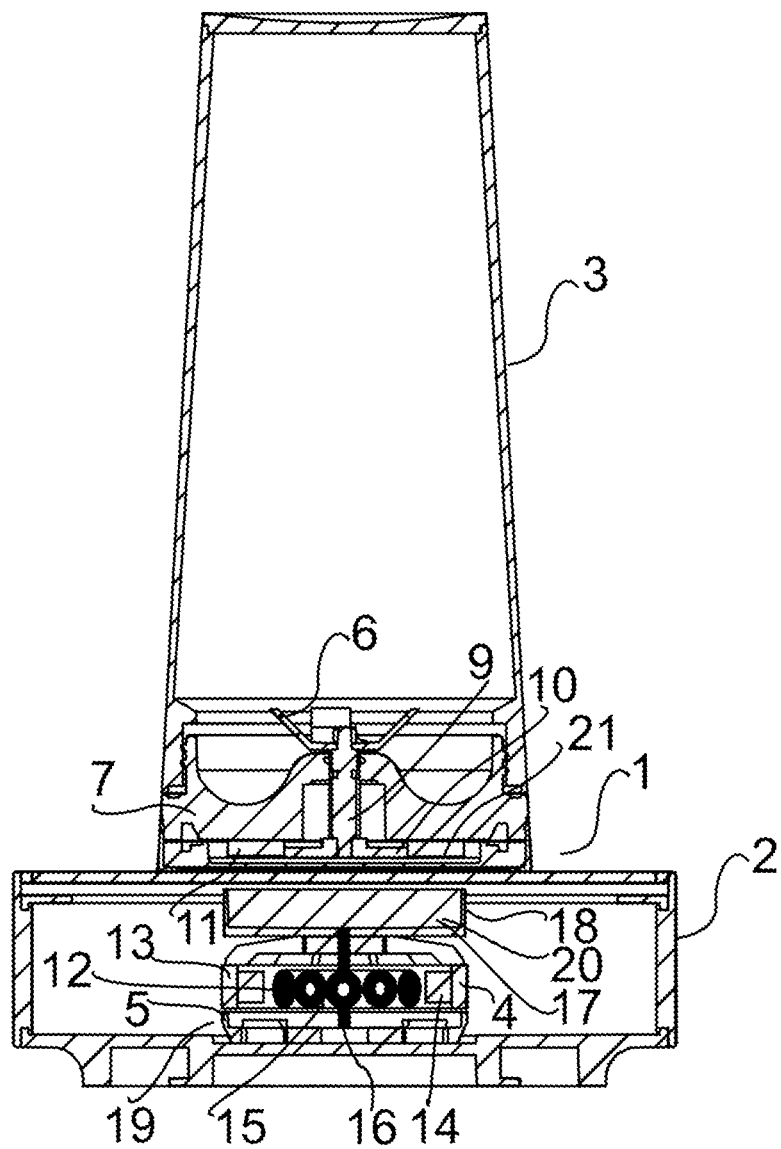
FIG. 3 is a schematic representation of food and beverage processing device, comprising two permanent magnets (11) instead of a metal disc (8). Cross section view.
Figure 4:
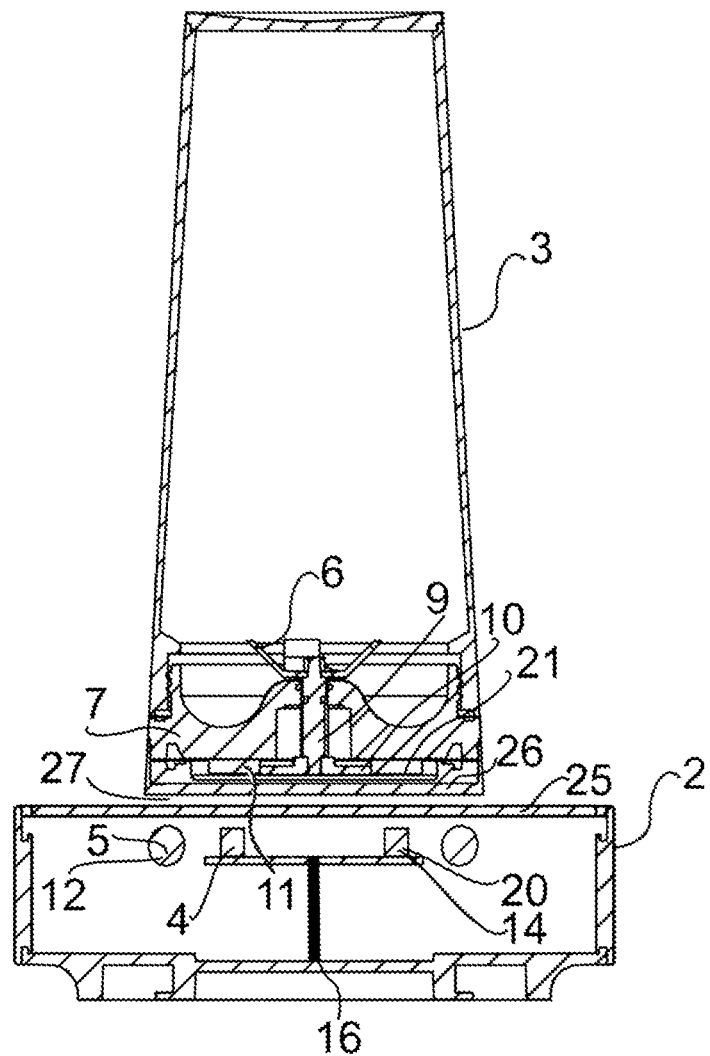
FIG. 4 is a schematic representation of food and beverage processing device, comprising a thin gap (27) between the base (2) and the lid (7). Cross section view.
Figure 5:
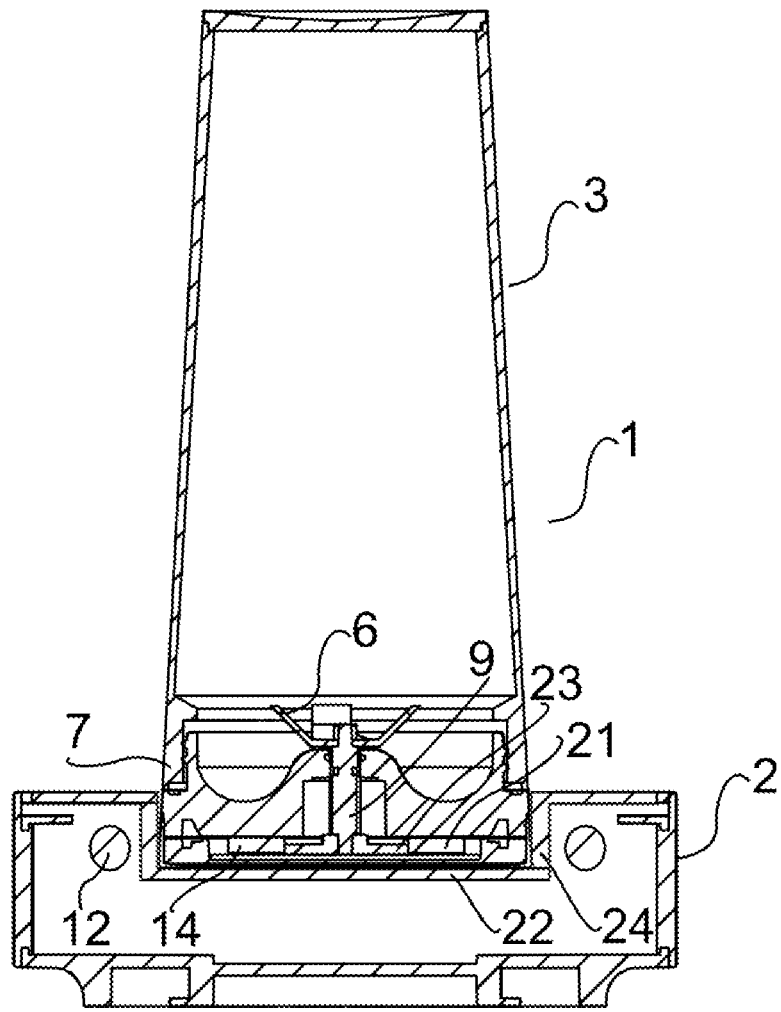
FIG. 5 is a schematic representation of food and beverage processing device, where the base (2) comprises a recess (22). Cross section view.

This invention comprises a food and beverage processing device (1), which can be used as a mixer, a blender, a bottle, etc. This device employs alternating magnetic flux for rotation of the blade (6) assembly. This means that it comprises a magnetic coupling between the parts, embodied into the base (2) of the blender and the lid (7) of the blending bottle (3); it works by a principal of flipped-up bottle and is composed of two separate parts, where one is a removable bottle (3), comprising a second component (21) of the magnetic coupling, installed into the lid (7), and another is the base part (2) with an electric motor (19), and the first component (20) of the magnetic coupling. The lid (7) and the base (2) are not bounded by any physical fixation (mechanical coupling) mechanism (retainers, etc.). Nonetheless, the base (2) comprises an utterly even surface, which simplifies the use and daily maintenance of the device.

In the most preferred embodiment, food and/or beverages are filled into the glass or plastic bottle (3), a lid (7), comprising a metal (could be an aluminum, a copper or other material, suitable for a magnetic coupling) disc (8), is placed onto the open end of the bottle (3). The blade (6) assembly is installed into the bottom side of the lid (7), which by means of a shaft (9) (an elongated part), is connected to the metal disc (8), installed into the lid (7). Therefore, blades (6), installed into the lid (7) are connected with the rotor (4) of the motor between the magnetic coupling. Nonetheless, hermetically sealed by the lid (7), the blades (6) end up within the inner extent of the container, interacting with the inner ingredients of the container.

The component (21) of the magnetic coupling, housed inside the lid (7) is installed in a separate chamber, which is hermetically sealed with respect to the inside of the bottle (3) by, for instance, a shaft-mounted glands. The chamber of the magnetic coupling component (21) must be impermeable, so that processed contents could not get inside the chamber.

In one embodiment of the invention, the metal disc (8), enclosed inside the lid (7), is replaced by a retainer (10), in which two or more permanent magnets (11) are arranged in such manner, which would enable full functionality of the magnetic coupling, where the purpose of the aforementioned parts is the same as the metal disc's (8)—to compose the second component of the magnetic coupling, which transfers torque to the blade (6) assembly.

Construction of second component of the magnetic coupling can have various configurations, forms and be made of various materials, which are suitable for production of such constructions, from the most basic metal disc to complex arrangements of multiple magnets. However, a specific embodiment of the aforementioned component should not limit the scope of the invention if the second component of the magnetic coupling is embodied into the lid (7) of the food processing device (1) and the magnetic coupling is used for rotation of the blade (6) assembly.

In the most preferred embodiment, in one of two main parts of the food processing device (1), which is the base (2), onto which the container, comprising second component (21) of the coupling, is placed in a flipped-up manner, a stator (5) is mounted, which comprises two or more electric coils (12), arranged symmetrically at different locations with respect to the shaft, where the electric current, flowing through the windings of the coils, generates magnetic flux and rotates the rotor with the retainer (13), in which two or more permanent magnets (14) are embedded.

In one embodiment of the invention, the electric motor (19), embedded into the base (2), is a brushless hub motor, which is composed of electromagnetic coils in the stator and permanent magnets in the rotor. The windings (12) of the coils in the stator are mounted in the retainer (15) of the rotor, which is stationary with respect to the housing of the base (2), as it is affixed to the bottom part of the base (2). The coils (12) in the retainer (15) are mounted in such a manner that it would be arranged throughout the sides of the retainer in a circular manner around the shaft (16). A cylindrical recess is arranged in the center of the retainer of the coils, and the shaft (16) of a corresponding shape goes through it. Permanent magnets (14), arranged in the rotor together with the external housing (13) of the hub motor, can rotate around the aforementioned axis of the shaft (16) or together with the shaft (16)—around the junction point of the shaft and the housing of the base (2). The first component of the magnetic coupling, which comprises the retainer of the magnets (17), and the permanent magnets (18), arranged inside the retainer, is mounted onto the top of the external surface of the housing (13). The aforementioned retainer (17) is made in such manner that it could house circularly arranged magnets (18), which compose the core of the first component of the magnetic coupling. Once an electric current starts flowing through the coils (12), the external housing (13) of the motor together with the first component of the magnetic coupling (17, 18), starts to rotate around the shaft (16), thus inducing rotation of the second component (21) of the magnetic coupling together with the blade (6) assembly, housed inside the lid (7).

In another embodiment, the coils (12) of the stator (5) or solenoids of electromagnets are arranged around the rotor (4), and the rotor comprises permanent magnets (14), arranged in such manner that the alternating magnetic flux, generated by the electromagnets of the stator, rotates the rotor together with the permanent magnets (14), mounted onto the shaft (16). In this embodiment, the rotor itself composes the first component (20) of the magnetic coupling. In this case it is useful that the horizontal surface (25) of the base's housing, which is embedded atop the rotor, and onto which the container facing upside-down is being stationed, is made from a thin diamagnetic material. Nonetheless, the horizontal surface (26) of the container's lid should be made from thin diamagnetic material. Such approach enables to obtain a thin gap (27) between the components of the magnetic coupling, and ensure an effective interaction as well as low energetic losses.

In another embodiment, only one component of the magnetic coupling is provided—the one, which is integrated inside the lid of the container. This is obtained by forming a recess of the second component of the magnetic coupling into the top surface of the base (2). Hence, a recess (22) inside the upper part of the base, which contains circularly arranged stator's coils, is produced correspondingly to the protrusion of the bottom side of the lid (7), thus enabling the component (21) of the magnetic coupling to act as a rotor of electric motor, as the lid (7) is embedded onto the base (2) by protruding into the hollow of the base, arranging the aforementioned components in a similar horizontal level. The magnets, arranged inside the lid of the container, are mounted onto a rotating shaft (23), and interact with the stator coils (12), housed inside the base (2), which rotates the magnets, if an electric current flows through the coils. In this embodiment, to obtain an effective interaction between electromagnets of the stator and permanent magnets of the rotor, housed inside the lid, thin side walls of the lid (7), and thin side walls (24) of the cavity (22) of the base, must be provided, as well as a thin gap between the aforementioned surfaces, when the container is stationed onto the base, must be ensured. In overall, the shortest possible distance between the stator's electromagnets inside the base (2) and the rotor's permanent magnets (14) inside the lid (7) must be attained.

There are many constructional variations of stators and rotors or methods, how to arrange permanent magnets or electromagnetic coil windings inside the base or instead of windings use other electronic elements in order to connect the rotor to the first component of the magnetic coupling, or for it to act as component of the magnetic coupling itself. Based on this invention, a person skilled in the art could easily select a suitable construction, that's why the aforementioned constructional variations should not limit the scope of the invention, as long as electronic elements and variations of how to arrange them are used in a food processing device (1), which employs a magnetic coupling for rotation of the blade (6) assembly, operates in an upside-down stationed blender principal and is composed of two separate parts, where one is a portable container, another—the base (2), which houses an electric motor or at least a part of it.

In the most preferred embodiment, the lid (7) with the blade (6) assembly and the second component of the magnetic coupling are removed from the glass or plastic bottle (3) after the food processing is finished, in order to use the aforementioned bottle (3) as a food container. For the sake of convenience, a user can put another lid instead of the primary lid (7), which would be used for the transportation of the container along with its contents, or a lid with a straw holder, or a specially adapted lid for the containment of the container until it's cleaning, etc.

Nonetheless, the invention can be implemented in such manner, that all of the controls could be made throughout the use of a smart control device via WiFi, Bluetooth or other protocol or other type of interface. In this case, the construction of the blender simplifies drastically—the necessity of buttons, indicators, speed regulators, etc. is suspended. Blending speed or even a certainly alternating mode could be controlled by the aforementioned portable device. This device could also save and provide recipes for cocktails, as well as a processing mode for each cocktail. For instance, if a certain cocktail contains bananas as an ingredient, a processing mode could be set up in such manner, that the inverts of the blades could be cyclically variated, in order to process the banana most effectively.

The invention claimed is:

1. A food and beverage processing device, comprising a magnetic coupling connected to a blade assembly wherein the magnetic coupling rotates the blade assembly by an applied alternating magnetic flux, the device further comprising:
   a base, comprising an electric motor or a stator, a first component of the magnetic coupling, and an utterly even surface;
   a blending, crushing, or mixing container, comprising a bottle and a lid, the lid being configured with the blade assembly and a second component of the magnetic coupling,
   characterized in that said container, in a closed state, is adapted for stationing it on the base with the lid facing down for working by a principle of flipped-up bottle; wherein the lid and the base are not bounded by any mechanical coupling mechanism; in that the second component of the magnetic coupling is integrated into the lid in a separate chamber; wherein the separate chamber is hermetically sealed with respect to the inside of the container.

2. The food and beverage processing device according to claim 1, characterized in that the second component of the magnetic coupling, integrated into the lid, comprises an electrically conductive metal disc, in which Foucault currents can be induced.

3. The food and beverage processing device according to claim 1, characterized in that the second component of the magnetic coupling, integrated into the lid, further comprises a system of at least two permanent magnets, where the permanent magnets are arranged in a manner to induce magnetic coupling.

4. The food and beverage processing device according to claim 1, characterized in that the base of the device further comprises:

a stator, which comprises at least two coils, arranged in different sides with respect to the shaft of the device, and a rotor comprising at least two permanent magnets; and wherein the at least two coils of the stator conduct current through the coil windings thereby creating an alternating magnetic flux and causing rotation of the rotor.

5. The food and beverage processing device according to claim 4, characterized in that the at least two permanent magnets of the rotor of the base are connected to the first component of the magnetic coupling through a mutual shaft.

6. The food and beverage processing device according to claim 4, characterized in that the at least two permanent magnets of the rotor of the base are adapted to operate as the first component of the magnetic coupling.

7. The food and beverage processing device according to claim 1, characterized in that the base of the device has a cavity wherein the outside circumference of the cavity is surrounded by the at least two coils of the stator and the inside circumference is adapted to fit the container with the lid; wherein the at least two stator coils produce an alternating magnetic flux within the cavity of the base, and wherein the second component of the magnetic coupling is situated within the area of alternating magnetic flux, and the second component of the magnetic coupling acts as a rotor.

* * * * *